(12) United States Patent
Di Lullo et al.

(10) Patent No.: US 7,311,468 B2
(45) Date of Patent: Dec. 25, 2007

(54) PROCESS FOR THE DISPOSAL OF SULFUR

(75) Inventors: Alberto Di Lullo, Sirmione-Brescia (IT); Paul Thomas Lockhart, Lodi (IT)

(73) Assignees: ENI S.p.A., Rome (IT); Enitecnologie S.p.A., San Donato Milanese (IT)

( * ) Notice: Subject to any disclaimer, the term of this patent is extended or adjusted under 35 U.S.C. 154(b) by 0 days.

(21) Appl. No.: 10/562,434

(22) PCT Filed: Jul. 5, 2004

(86) PCT No.: PCT/EP2004/007306

§ 371 (c)(1),
(2), (4) Date: Dec. 28, 2005

(87) PCT Pub. No.: WO2005/014191

PCT Pub. Date: Feb. 17, 2005

(65) Prior Publication Data

US 2006/0188338 A1    Aug. 24, 2006

(30) Foreign Application Priority Data

Jul. 18, 2003   (IT) .................. MI2003A1470

(51) Int. Cl.
*B09B 1/00* (2006.01)
*B65G 5/00* (2006.01)
(52) U.S. Cl. ............................................. 405/53; 299/6
(58) Field of Classification Search ................ 405/53; 299/6
See application file for complete search history.

(56) References Cited

U.S. PATENT DOCUMENTS

| 3,661,424 | A | * | 5/1972 | Jacoby | ............................ | 299/4 |
| 3,690,377 | A | | 9/1972 | Knight | | |
| 3,736,744 | A | * | 6/1973 | Bailey | ......................... | 60/698 |
| 4,428,700 | A | | 1/1984 | Lennemann | | |
| 5,340,383 | A | * | 8/1994 | Womack | ...................... | 95/243 |
| 6,582,025 | B2 | * | 6/2003 | Pickren | ......................... | 299/6 |

* cited by examiner

*Primary Examiner*—John Kreck
(74) *Attorney, Agent, or Firm*—Oblon, Spivak, McClelland, Maier & Neustadt, P.C.

(57) ABSTRACT

Process for the disposal of sulfur which comprises melting the sulfur, optionally in the presence of hydrogen sulfide, and injecting the molten sulfur into geological structures having a temperature ranging from 90 to 160° C.

16 Claims, No Drawings

PROCESS FOR THE DISPOSAL OF SULFUR

This application is a National Stage application of PCT/EP04/07306, filed Jul. 5, 2004. Priority to Italian application MI2003 A 001470 is claimed.

The present invention relates to a new process for the disposal of sulfur.

More specifically, the present invention relates to a new process for the disposal of sulfur coining from the purification treatment of hydrocarbons of a fossil nature, for example crude oil or natural gas.

It is well known that sulfur can be present in considerable quantities in both extracted crude oil and natural gas. In this gas, the sulfur can be present in the form of $H_2S$ in a percentage molar quantity which can reach 10% and in particular certain cases it can even exceed 20%, referring to gas.

When present in high concentrations in gas, the hydrogen sulfide is separated using various systems, of which the most widely used is absorption in solutions of ethanol amines. Once it is in the concentrated state, the hydrogen sulfide is transformed into elemental sulfur by means of the Claus process. At this point, it is necessary to allocate the sulfur which, for the last few years and potentially for tens of years to come, has a market characterized by an excessive offer with respect to the demand. Sulfur is normally stored in elemental form as huge blocks which require continual monitoring and treatment of the run off water to avoid the acidification of the ground and surrounding underground water. In addition to this, there is an increasingly strict legislation on the part of states containing oil fields or natural gas reservoirs, which in some cases impose heavy penalties for the storage of recovered sulfur.

The Applicants have now found an innovative process for the elimination of said large quantities of sulfur which envisages its injection into the ground by pumping it in the liquid state into adequate geological structures. These structures can consist of the field itself from which the crude oil or associated gas has been extracted or other adequate geological structures, such as abandoned mines or saline aquifers.

Thanks to the solution, object of the present invention, a permanent sulfur storage is obtained without any risk of its leaving the surface and contaminating usable groundwater or negatively interfering with the extraction process of crude oil/gas. Large accumulations of sulfur do in fact exist in nature in indefinitely stable geological structures and without having a negative impact on the surrounding environment.

An object of the present invention therefore relates to a process for the disposal of sulfur which comprises heating and melting the sulfur, optionally in the presence of hydrogen sulfide, and injecting the molten sulfur, in liquid and homogeneous form, into geological structures having a temperature ranging from 90 to 160° C.

The present invention envisages the pumping of sulfur in liquid form through surface pipes, well pipes and receiving geological structures. The molten elemental sulfur can come directly from the Claus process or from a surface storage site.

The pressure necessary for pumping the liquid obtained from the liquefaction of sulfur into a pipe can be calculated with the general formula:

$$\Delta P = 2 f \cdot \rho \cdot u_m^2 L / D_{eq}$$

wherein L is the length of piping used for injection into the geological structure. $D_{eq}$ its equivalent diameter, $u_m$ the average rate of the fluid pumped, $\rho$ the density of the fluid pumped and f the friction factor which is a function of the roughness of the pipe and Reynolds number:

$$Re = D_{eq} \cdot u_m \cdot \rho / \mu$$

wherein $\mu$ is the kinematic viscosity of the fluid. The pumping device can be represented by a conventional pump capable of processing fluids at temperatures ranging from 90° C. to 160° C. The viscosity values of the sulfur in the molten state within the temperature limits indicated are specified in Table 1 below.

TABLE 1

Viscosity of molten sulfur in relation to the temperature

| Temperature (° C.) | $\mu$ (cPoise) |
|---|---|
| 119 | 11.45 |
| 125 | 10.31 |
| 132 | 8.84 |
| 140 | 7.67 |
| 150 | 6.62 |
| 157 | 6.72 |
| 160 | 11.6 |

The geological structures which are appropriate for receiving the molten sulfur are those having temperatures ranging from 90° C. to 160° C. and, preferably, those forming the reservoir itself from which the crude oil or natural gas containing sulfur in the form of organic compound or hydrogen sulfide, are extracted. Alternatively, geological structures can be used, in a remote position with respect to the reservoir and having structural characteristics suitable for receiving and preserving the molten sulfur.

For the application of the present invention, either matrix geological structures or fractured structures, naturally or induced, can generally be used. In all cases, the pressure and maximum injection flow-rate of the fluid forming the molten sulfur, optionally mixed with hydrogen sulfide, can be determined by calculations and measurements well known to experts in stimulation treatment of production wells or the production and running of water reinjection wells.

The present invention requires the injection of sulfur in liquid form with a low viscosity. In the case of pure elemental sulfur, the appropriate conditions for the application of the present invention are obtained for temperatures ranging from 119° C. to 160° C. The field of application of the disposal process of sulfur, object of the present invention, can be enlarged by mixing elemental sulfur with other compounds capable of lowering the melting point of the mixture. A valid and economical system for reducing the melting point of sulfur consists in mixing it with $H_2S$ under pressure. Table 2 below indicates the melting points (Tm) of sulfur in the presence of $H_2S$ at different pressure values. In this way it is possible to lower the melting point of sulfur from 119° C. to 90° C. approximately.

TABLE 2

Influence of the $H_2S$ pressure on the Tm of sulfur

| Melting point of sulfur (° C.) | $H_2S$ pressure (bar) |
|---|---|
| 119 | 0 |
| 115 | 1 |
| 111 | 12 |

TABLE 2-continued

Influence of the H$_2$S pressure on the Tm of sulfur

| Melting point of sulfur (° C.) | H$_2$S pressure (bar) |
|---|---|
| 106 | 24 |
| 100 | 39 |
| 100 | 40 |
| 94 | 58 |
| 91 | 80 |
| 91 | 90 |
| 90 | 110 |
| 90 | 125 |
| 90 | 155 |

This lowering of the melting point of sulfur is verified, even if to a lesser degree, also when hydrogen sulfide is mixed with other gases without an analogous effect, such as, for example, methane or carbon dioxide. From the following table it can be observed how, at a fixed pressure (for example 200 bar) the melting point of sulfur decreases with an increase in the concentration of H$_2$S in the mixture with methane.

TABLE 3

Influence of the concentration of H$_2$S in methane on the melting point of sulfur at 200 bar

| Melting point of sulfur (° C.) | H$_2$S percentage in methane |
|---|---|
| 119 | 0 |
| 117 | 4.5 |
| 115 | 9 |
| 114 | 14 |
| 109 | 25 |
| 92 | 100 |

The possibility of applying the present invention also using hydrogen sulfide mixed with methane can prove to be economically advantageous if the receiving geological structure is at a sufficiently high temperature and the use of the mixture with methane can avoid the necessity of a separation process of methane from hydrogen sulfide.

Finally, it should be noted that the disposal system of sulfur, object of the present invention, allows part of the hydrogen sulfide separated from the associated gas to be used to fluidize the sulfur produced with the Claus process, thus reducing the total volume of H$_2$S to be sent to the Claus process itself.

Therefore, with respect to the practical embodiment of the present invention, the disposal process of sulfur should therefore be effected by selecting a suitable receptive geological structure having a temperature ranging from 90° C. to 160° C., optionally mixing the sulfur with hydrogen sulfide (preferably pure) so that the melting point of the mixture is lower than or equal to that of the receiving geological structure, heating the sulfur (or mixture) to a temperature which is sufficiently higher than the melting point so that, during the pumping process at the surface and in the well, the sulfur (or mixture) remains in the liquid state and, finally, pumping the sulfur (or mixture) into the reservoir through possibly insulated pipes.

The invention claimed is:

1. A process for the disposal of sulfur comprising:
   melting sulfur to provide molten sulfur; and
   injecting the molten sulfur into a geological structure having a temperature ranging from 90 to 160° C.,
   wherein the geological structure is a matrix geological structure or a fractured structure.

2. The process according to claim 1, wherein the sulfur comes from purification treatment of hydrocarbons of a fossil nature or from a natural gas.

3. The process according to claim 1, wherein the molten sulfur comes directly from the Claus process.

4. The process according to claim 1, wherein the sulfur comes from a surface storage site.

5. The process according to claim 1, wherein the geological structure is a matrix geological structure.

6. The process according to claim 1, wherein the geological structure is a fractured structure.

7. A process for the disposal of sulfur comprising:
   melting sulfur to provide molten sulfur; and
   injecting the molten sulfur into a geological structure having a temperature ranging from 90 to 160° C.,
   wherein melting sulfur is performed in the presence of hydrogen sulfide.

8. The process of claim 7, wherein the hydrogen sulfide is used in a mixture with other gases which do not have the capacity of reducing the melting point of the sulfur.

9. The process of claim 8, wherein the gas mixed with hydrogen sulfide is methane or carbon dioxide.

10. The process of claim 7, wherein the hydrogen sulfide is separated from natural gas.

11. The process according to claim 7, wherein the sulfur comes from purification treatment of hydrocarbons of a fossil nature or from a natural gas.

12. The process according to claim 7, wherein the molten sulfur comes directly from the Claus process.

13. The process according to claim 12, wherein the geological structure is a naturally fractured structure.

14. The process according to claim 12, wherein the geological structure is an induced fractured structure.

15. The process according to claim 7, wherein the sulfur comes from a surface storage site.

16. The process according to claim 7, wherein the geological structure is one forming the reservoir from which crude oil or natural gas containing sulfur are removed.

* * * * *